(12) United States Patent
Granruth

(10) Patent No.: US 8,791,806 B2
(45) Date of Patent: Jul. 29, 2014

(54) REAL-TIME DETECTION OF HAZARDOUS DRIVING

(75) Inventor: Michael D. Granruth, Marshall, VA (US)

(73) Assignee: Trimble Navigation Limited, Westminster, CO (US)

( * ) Notice: Subject to any disclaimer, the term of this patent is extended or adjusted under 35 U.S.C. 154(b) by 179 days.

(21) Appl. No.: 13/305,513

(22) Filed: Nov. 28, 2011

(65) Prior Publication Data

US 2013/0135090 A1     May 30, 2013

(51) Int. Cl.
    *B60Q 1/00*     (2006.01)

(52) U.S. Cl.
    USPC ................................ 340/439; 701/1; 701/123

(58) Field of Classification Search
    USPC ............ 340/438, 439, 460, 461, 462, 426.22, 340/426.24, 426.25, 426.31, 426.32, 456, 340/425.5
    See application file for complete search history.

(56) References Cited

U.S. PATENT DOCUMENTS

| | | | |
|---|---|---|---|
| 5,732,074 A | 3/1998 | Spaur et al. | |
| 5,752,768 A | 5/1998 | Assh | |
| 5,797,134 A | 8/1998 | McMillan et al. | |
| 6,064,970 A | 5/2000 | McMillan et al. | |
| 6,421,593 B1 | 7/2002 | Kempen et al. | |
| 6,502,035 B2 * | 12/2002 | Levine | 701/301 |
| 6,526,352 B1 | 2/2003 | Breed et al. | |
| 6,938,716 B1 | 9/2005 | Eull | |
| 7,389,178 B2 | 6/2008 | Raz et al. | |
| 7,623,248 B2 | 11/2009 | Laflamme | |
| 2002/0032517 A1 | 3/2002 | Buckelew et al. | |
| 2002/0106109 A1 | 8/2002 | Retterath et al. | |
| 2002/0120476 A1 | 8/2002 | Labelle et al. | |
| 2003/0163249 A1 | 8/2003 | Kapolka et al. | |
| 2004/0247157 A1 | 12/2004 | Lages et al. | |
| 2005/0055248 A1 | 3/2005 | Helitzer et al. | |
| 2006/0095207 A1 | 5/2006 | Reid | |
| 2007/0061066 A1 | 3/2007 | Bruelle-Drews | |
| 2008/0243350 A1 * | 10/2008 | Harkness | 701/93 |
| 2008/0255869 A1 | 10/2008 | Young et al. | |
| 2010/0103263 A1 * | 4/2010 | Kanning et al. | 348/148 |
| 2011/0060496 A1 * | 3/2011 | Nielsen et al. | 701/33 |
| 2013/0060520 A1 | 3/2013 | Amor et al. | |

OTHER PUBLICATIONS

Ernst D. Dickmanns "A General Cognitive System Architecture Based on Dynamic Vision for Motion Control", Aero- Space Engineering, Universitaet der Bundeswehr Munich, Systemics, Cybernetics and Informatics, vol. 1 #5, Germany.

Eur Ing Martin Herbert New Technology in the Car—The Current State of Development, IEE, 1998, London UKL.

Kari Torkkola et al. "Sensor Selection for Maneuver Classification", Arizona State University, 2004, Arizona, USA.

Kari Torkkola et al. "Sensor Sequence Modeling for Driving", Arizona State University, Arizona, USA.

(Continued)

*Primary Examiner* — Brian Zimmerman
*Assistant Examiner* — Sara Samson
(74) *Attorney, Agent, or Firm* — Kilpatrick Townsend & Stockton LLP

(57) ABSTRACT

A system is disclosed which provides real-time detection of hazardous driving behavior. The system collects information about the motion of a vehicle along a path, for example, using a global positioning satellite system receiver. Roadside signs along the path are detected and their content determined. That information is compared with information about the motion of the vehicle to provide information with regard to potentially hazardous driving behavior.

23 Claims, 3 Drawing Sheets

(56) References Cited

OTHER PUBLICATIONS

M. McDonald et al. The Role of the instrumented vehicle in the collection of data on driver behaviour, Institute of Electrical Engineers, 1997, London, UK.

Nobuyuki Kuge et al. "A Driver Behavior Recognition Method Based on a Driver Model Framework", 2000-01-0349, Society of Autmotive Engineers, Inc., 1998.

Nuria Oliver et al. "Graphical Models for Driver Behavior Recognition in a SmartCar", Proceedings of the IEEE Intelligent Vehicles Symposium 2000, Oct. 3-5, 2000, Michigan, USA.

Randall L. Guensler et al. "The Role of Instrumented Vehicle Data in Transportation Decision Making", DMinUCE London 2002.

U.S. Appl. No. 10/770,998: Office Action-dated Mar. 5, 2008.
U.S. Appl. No. 10/770,998: Office Action-dated Jan. 8, 2009.
U.S. Appl. No. 10/770,998: Office Action-dated Jun. 13, 2008.

* cited by examiner

REAL-TIME DETECTION OF HAZARDOUS DRIVING

BACKGROUND OF THE INVENTION

Real-time detection of road signs, such as speed limit and stop signs, can be incorporated into driver safety and driver behavior solutions to provide situational awareness of driver behavior and to facilitate safer vehicle operation.

Many automobiles today incorporate numerous safety features to assist the driver. For example, antilock brakes assist a driver in stopping a car faster than otherwise possible, even enabling steering with fully applied brakes. Some manufacturers have incorporated technology for detecting potentially dangerous driver behavior, for example, drowsiness. These systems, however, are not aware of conditions in the world outside the automobile. For example, the technology used to detect drowsiness relies upon factors such as frequency of steering wheel corrections, or detection of the driver's eye position.

U.S. Pat. No. 7,623,248 entitled "Automatic Asset Detection, Location Measurement and Recognition," published Jul. 26, 2007 and commonly assigned, describes a survey vehicle which uses a laser to scan a nearby region through which the vehicle passes to detect and recognize objects such as road signs. This system enables municipalities to inventory signs on their premises, and to detect information about those signs, for example, whether they require replacement.

BRIEF SUMMARY OF THE INVENTION

We have developed a system for real-time detection of hazardous driving which not only detects driver behavior, but also relates that behavior to conditions external to the vehicle. Our system collects data about driver control signals applied to a vehicle moving along a path and collects data about the motion of the vehicle along the path. The system detects roadside signs along the path as the vehicle moves toward them, and detects the content of the roadside signs which are detected. The system then compares the detected content of the roadside signs with the driver control signals and the motion of the vehicle. Based on that comparison the system provides information with regard to operation of the vehicle, including whether the vehicle is being operated in accordance with the signs detected.

DETAILED DESCRIPTION OF THE INVENTION

Figure 1:
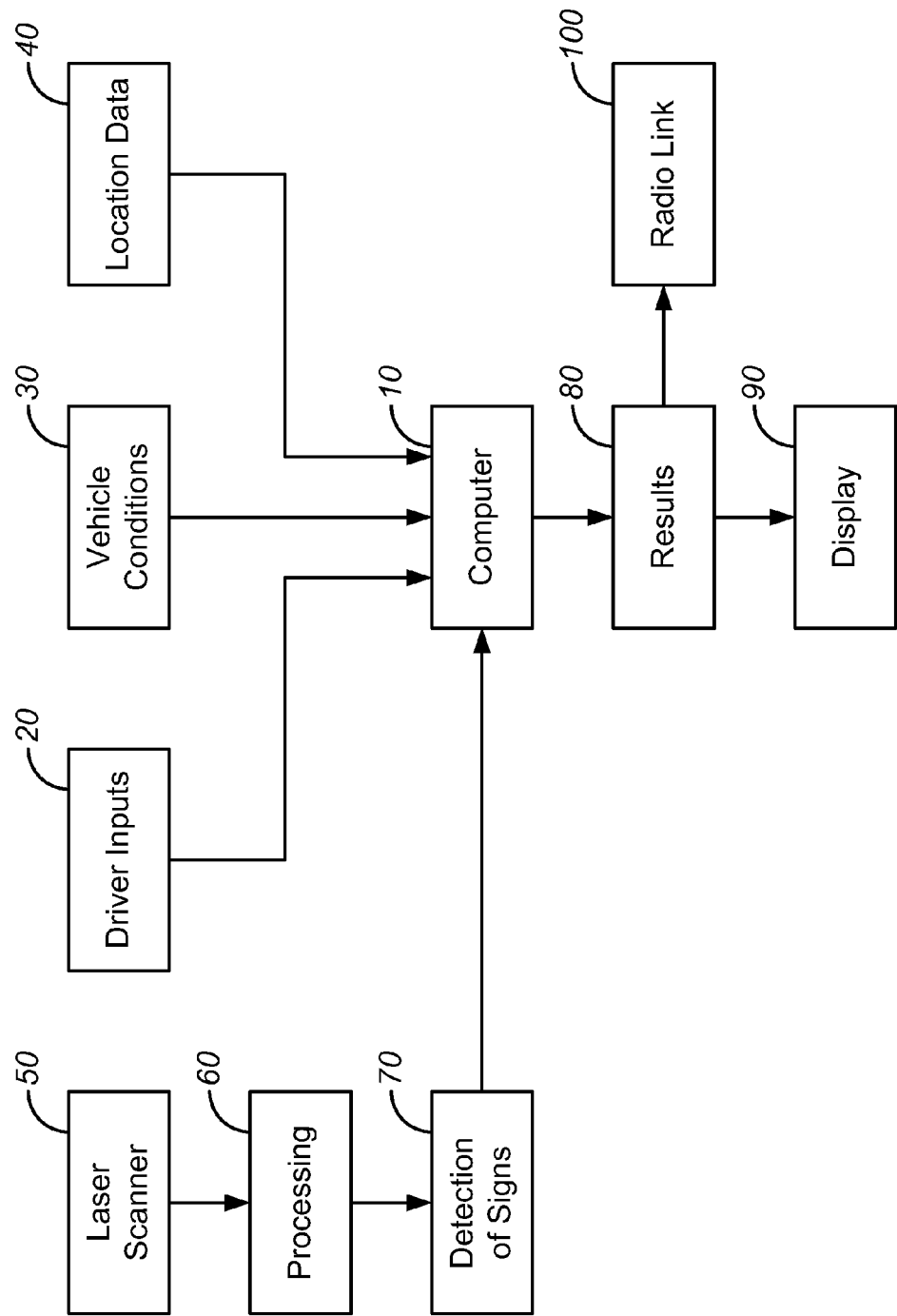
FIG. 1 is a block diagram of the apparatus for enabling real-time detection of hazardous driving.

FIG. 1 is a block diagram of apparatus for enabling real-time detection of hazardous driving. As shown in FIG. 1 information is collected by a computer 10 which receives input data from a variety of devices. Information about the driver inputs 20 to the vehicle are provided to computer 10. These driver inputs include condition of the accelerator pedal and brake pedal, extent of any turn in the steering wheel, and other information, e.g. gear selected, headlight switch position, about controls activated or in use by the driver.

Computer 10 also receives information 30 about the vehicle. This information about the vehicle can include information strictly about the motion of the vehicle, for example, as collected by a global positioning satellite system receiver. This information can be confined to the velocity of the vehicle, or in addition the collected information can include information about the operating conditions of the vehicle itself, e.g. information from the engine controller, information indicative of the transmission gear, RPM, oil pressure, door locks, etc. In some applications of the system of this invention, computer 10 also collects information such as location data, for example, by relying upon GPS system 40, which specifies the location of the vehicle, enabling identification of what road or street the vehicle is traversing, whether it is traveling uphill or downhill, its proximity to other known locations, etc.

Importantly, the computer 10 also receives information about the region immediately surrounding the vehicle, and in particular, roadside signs such as speed limit signs, yield signs, stop signs, etc. This information is derived from a laser scanner 50 positioned on the vehicle. Such laser scanners are commercially available, for example, from the assignee herein.

As the vehicle moves along a road, the laser scanner detects signs positioned near the roadway. The laser scanner 50 includes a camera and a laser mounted on the exterior of the vehicle, or in an interior location, for example, behind the rearview mirror. For passenger vehicles, the device can readily be concealed in a location behind the grill or behind the windshield, such as in the back of the rearview mirror. For commercial vehicles, such as trucks, etc. the device may be exposed by being mounted on the roof of the vehicle, behind the grill, on the front of the trailer, or in other locations, from which the roadside signs are visible. The laser scanner preferably includes detection of range and angle measurements, and can include intensity detection and color detection. As the vehicle progresses along the road, the laser device scans the road laterally to detect objects along the right-of-way. The laser is preferably installed to scan horizontally in front of the vehicle, enabling scanning of the right-of-way profile. Orientation of the laser scanner is configured so that reflective signs can be detected by the change in brightness of the reflected laser signal.

As the laser collects data with regard to the roadside, the images are collected along with identification of any reflective (or other criteria) aspects of the image. These reflective (or other criteria) portions of the collected images typically will be roadside signs having information such as speed limit, stop, yield, turn lanes, as well as numerous other well known aspects.

Detection of the signs from the arriving video signals is performed using a series of steps, e.g. as described in U.S. Pat. No. 7,623,248, incorporated by reference herein, primarily finding an object of interest, then measuring the size of the object. By searching the data arriving from the laser for specific features of interest such as shape, height above the roadway, reflectivity, color, etc., the signs are detected. Processing of the arriving data can be adjusted to emphasize aspects of the arriving data. For example, signs more than a particular number of seconds ahead of the vehicle can be ignored until the vehicle is closer to them. The detection of an object such as a roadside sign is performed by searching the laser data stream for specific object features, for example, reflectivity, height above the road, size, etc. Furthermore, the determination of the objects of interest can include filtering to define how close together two points need to be before they are considered to be the same object. As the scanning continues, the computer determines what aggregation of laser scan points consists of a single object of interest.

One technique for processing data from laser scanner 50 is described in the commonly assigned US Patent referenced above. The technique described there filters data from the reflected laser beam based upon the height of the reflective portion of the object above the ground, then estimates the size and center of the object, and then filters out objects that are too small to be considered road signs.

Once the presence of an object in the vicinity of the vehicle is detected, the object can be measured by computing the extent of the aggregated set of points for the object. Using the laser orientation and scan frequency the approximate size of the object can be determined. Once the approximate size is determined, then the object can be classified based on various characteristics e.g. its distance from the road, its size, its overall shape, based on that determination, information about the sign 70 is provided to computer 10. More information with regard to the manner by which the detection and identification process occurs can be found in the commonly assigned patent cited above.

As the data is provided to computer 10, it begins generating results 80. These results enable notification back to the driver via a display 90 within the vehicle to provide the driver with information about driver behavior, for example speeding, turning too quickly, changing lanes too often, failure to yield, running a stop sign, driving through a yellow light, etc. In addition, in the case of commercial vehicles such as a passenger bus, where it may be desired to monitor driver behavior, the results can be sent by radio link 100 to a remote location. At this location, information about drivers may be compiled to enable improved training classes, changes in vehicle dynamics, or other actions to enhance safety. Other types of behavior that can be detected using the system described herein include activities that consume excessive fuel, rapid acceleration and deceleration, swerving from one lane to another, failure to use turn signals, etc.

An example of a method for generating a safety report for fleet of vehicles is described in US Patent Application 2008/0255869 published Oct. 16, 2008, and entitled "Generating Safety Report for Fleet of Vehicles" which is incorporated by reference for all purposes. This published application describes a technique by which safety reports may be generated, based on the vehicle data, however, without awareness of conditions external to the vehicle.

Figure 2:
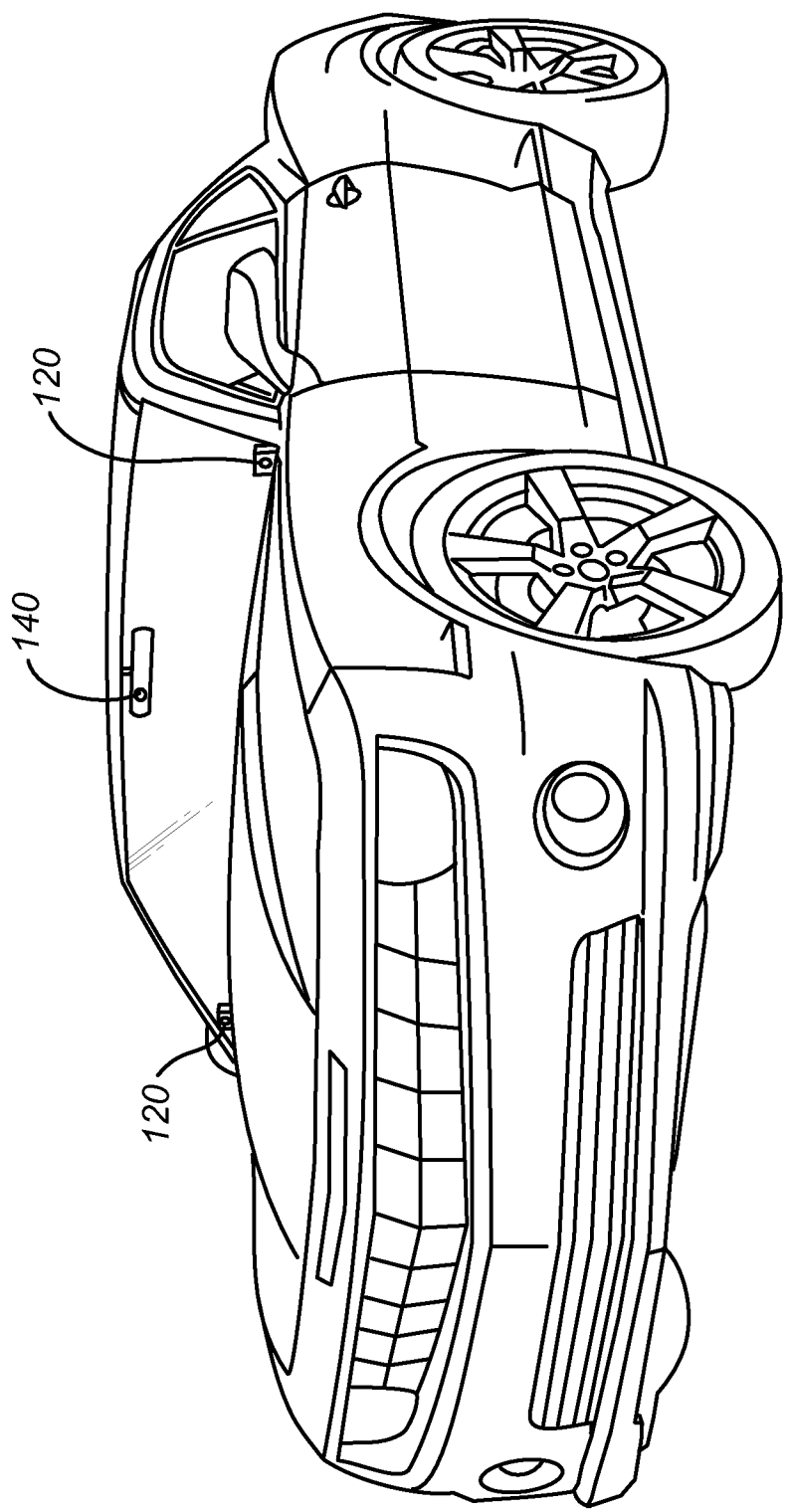
FIG. 2 is a perspective view of a vehicle equipped with the apparatus of FIG. 1.

FIG. 2 illustrates a vehicle equipped with the laser scanner and camera used to detect the environment through which the vehicle is traveling and identify road signs or other desired objects. A camera 120 and a laser scanner 140 are shown mounted behind the windshield, with the camera in the corner of the windshield and the laser scanner behind the rearview mirror. Of course, these locations are merely illustrations. These devices may also be mounted behind openings in the grill at the front of the vehicle, beneath the headlights, or if other desired locations where roadside signs can be viewed as the vehicle approaches them.

Camera 120 is typically a digital video camera which acquires images as the vehicle moves. The laser scanner sweeps a laser beam back and forth and up and down across the path of the vehicle as it advances. In the United States it will be advantageous for the laser scanner to focus primarily on the right-hand side of the road where most roadside signs will be located. The primary detection mechanism of the laser is the reflectivity of roadside signs, which in the United States are required to have a defined region collectivity in accordance with Department of Transportation or other federal and state standards. Numerous computer processing techniques are known for identifying objects in a video stream, and any appropriate one of these may be employed to identify the roadside signs. The techniques described in the commonly assigned patent referenced above are one example.

Figure 3:
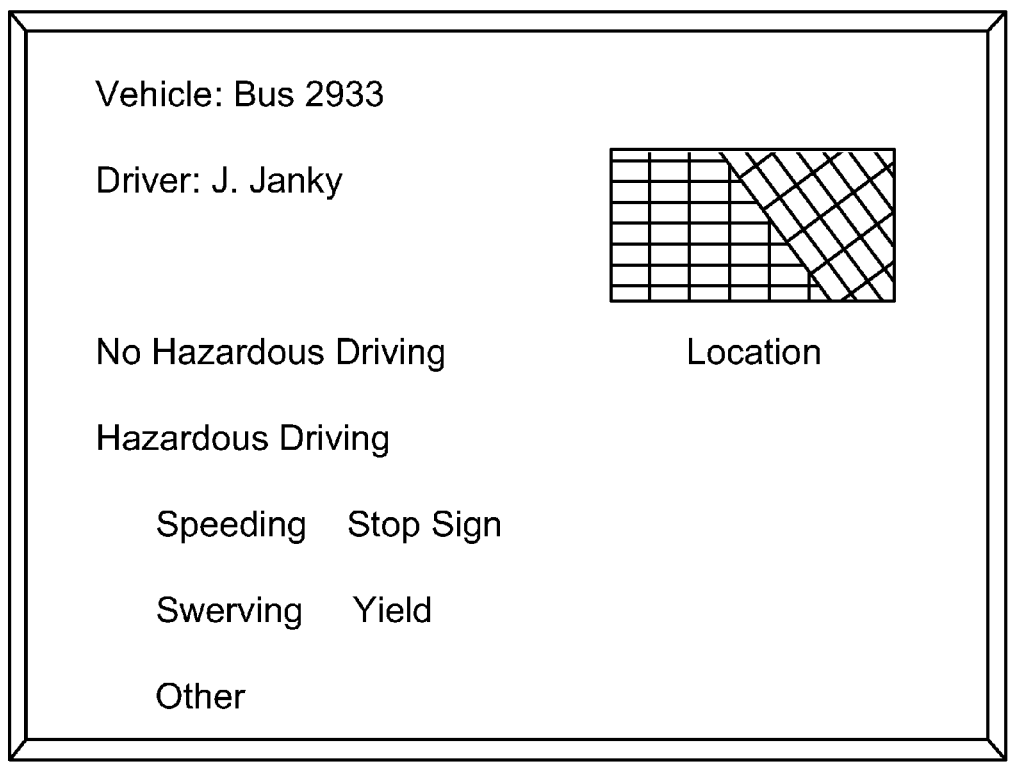
FIG. 3 illustrates a display screen.

FIG. 3 illustrates a typical display screen coupled to the system such as described above. As mentioned, the display screen may be in the vehicle itself, or in a remote location. Of course, it will be appreciated that other types of displays may be provided; the one illustrated is just an example. The display screen can provide whatever information the user likes with regard to the hazardous driving conditions. In FIG. 3 the display screen lists the vehicle type, the driver's name, and a map illustrating the location of the vehicle at the present time. The vehicle location can be provided using well-known GPS systems.

In the illustration, the text will typically be "grayed out" when not applicable to the circumstance. For example, assuming that no hazardous driving conditions are detected, only the portion of the display labeled "no hazardous driving" will be illuminated. If hazardous driving is occurring, or has occurred within a preset previous period, then the portion of the display labeled "hazardous driving" will be illuminated, together with the condition detected, e.g., speeding. Depending upon the number of conditions defined by the system as hazardous, a field designated "other" can allow the user to progress to another screen, or submenu, as needed. Of course other information as might be desired by a dispatcher of vehicles could also be provided on the same screen, for example, time to the next maintenance service, number of miles traveled that day, distance to next delivery location, or other information.

In the preceding description the use of lasers to detect roadside signs has been described. It will be appreciated that other techniques may be employed for detection of roadside signs. One example of such an approach is to use radio frequency identification (RFID). In RFID technology radio waves transfer data from a tag ("RFID tag") to a reader. The RFID tag includes a small radio frequency transmitter and a receiver. The reader transmits a radio signal to interrogate the tag. In response the tag receives the message and responds with the stored identification information. The tag can be battery powered, but for lower cost implementations uses energy from the radio signal sent by the reader to power its transmission circuit. By placing such tags on roadside signs, the tag can provide information about the sign, notably its content and location. Of course other information can also be included on the tag such as the date of installation. Such RFID tags allow interrogation by vehicles passing the roadside sign.

Typically RFID readers have directional antennas which can be aimed to detect signs with RFID tags along the direction of travel or at an angle from the direction the vehicle is traveling, e.g. 30° or 45° off the line of travel. By use directional antennas the range of detection of the RFID tags can be extended. An RFID detection antenna can be mounted in many places on the vehicle, for example, inside the grill at the front of the car, attached to one side or the other of the car, on a bumper, or even, in the case of plastic bumpers, behind the bumper. Additional information regarding the use of RFID tags in transportation services can be found in commonly assigned co-pending U.S. patent application entitled: "Method and System for Position Determination Using RFID Devices," Ser. No. 13/225,003, filed Sep. 2, 2011, the contents of which are incorporated by reference herein.

The foregoing has been a description of a preferred embodiment of the invention. It will be appreciated that various modifications may be made to the illustrative examples described above without departing from the scope of the invention, as set forth by the claims below.

What is claimed is:

1. A method for real-time detection of hazardous driving comprising:
    collecting first data about driver control signals applied to a vehicle moving along a path;
    collecting second data about the motion of the vehicle along the path;
    detecting roadside signs along the path as the vehicle moves toward them, by:
        scanning the roadside along the path to detect roadside signs;
        capturing images of the roadside; and
        processing the captured images to identify roadside signs based on size and shape of the roadside signs;
    determining content of the roadside signs detected along the path;
    comparing the detected content of the roadside signs with the driver control signals and the motion of the vehicle; and
    in response to the step of comparing, providing information with regard to the operation of the vehicle.

2. A method as in claim 1 wherein the information with regard to the operation of the vehicle comprises information regarding whether the vehicle is being operated in a hazardous manner.

3. A method as in claim 1 wherein the step of detecting roadside signs along the path comprises:
    scanning the roadside along the path to detect roadside signs;
    capturing images of the roadside; and
    processing the captured images to identify roadside signs.

4. A method as in claim 1 wherein the step of detecting roadside signs along the path comprises detecting radio emissions from tags associated with the roadside signs.

5. A method as in claim 4 wherein the radio emissions originate from RFID tags placed near the roadside signs.

6. A method as in claim 1 wherein the step of collecting first data comprises monitoring control signals applied to the vehicle by the driver and supplying them to a computer.

7. A method as in claim 1 wherein the step of collecting second data about the motion of the vehicle comprises collecting data about the speed of the vehicle and its orientation.

8. A method as in claim 1 wherein the step of in response to the step of comparing, providing information further comprises displaying that information to the driver.

9. A method as in claim 1 wherein the step of in response to the step of comparing, providing information further comprises transmitting the information to a location remote from the vehicle.

10. A method as in claim 1 wherein the information is transmitted to the remote location by radio.

11. A method as in claim 1 wherein the method further comprises collecting information about the vehicle location using signals from global positioning satellites.

12. A method as in claim 2 wherein the hazardous driving comprises at least one of not stopping at a stop sign and exceeding a posted speed limit.

13. A method for real-time detection of hazardous driving comprising:
    collecting data about driver control signals applied to a vehicle moving along a path;
    using global positioning satellites collecting data about the motion of a vehicle along the path;
    detecting roadside signs along the path as the vehicle moves toward them;
    determining content of the roadside signs detected along the path;
    comparing the detected content of the roadside signs with the data about driver control signals and the motion of the vehicle; and
    in response to the step of comparing, providing information with regard to the operation of the vehicle, wherein the information with regard to the operation of the vehicle comprises information regarding whether the vehicle is consuming excessive fuel.

14. A method as in claim 13 wherein the information with regard to the operation of the vehicle comprises information regarding whether the vehicle is being operated in a hazardous manner.

15. A method as in claim 13 wherein the step of detecting roadside signs along the path comprises:
    scanning the roadside along the path to detect roadside signs;
    capturing images of the roadside; and
    processing the captured images to identify the roadside signs.

16. A method as in claim 15 wherein the step of detecting roadside signs along the path as the vehicle moves toward them comprises detecting radio emissions from the roadside signs.

17. An apparatus for real-time detection of hazardous driving comprising:
    an input for receiving data about driver control signals applied to a vehicle moving along a path;
    a global positioning satellite system receiver for collecting information about motion of a vehicle along the path;
    a scanner for detecting roadside signs along the path as the vehicle moves toward them, by:
        scanning the roadside along the path to detect roadside signs; and
        capturing images of the roadside;
    a processor for determining content of the roadside signs detected along the path by processing the captured images to identify roadside signs based on size and shape of the roadside signs, and comparing the detected content of the roadside signs with the data about driver control signals and the motion of the vehicle and
    in response providing information with regard to the operation of the vehicle, wherein the information with regard to the operation of the vehicle comprises information regarding whether the vehicle is consuming excessive fuel.

18. Apparatus as in claim 17 wherein the information with regard to the operation of the vehicle comprises information regarding whether the vehicle is being operated in a hazardous manner.

19. Apparatus as in claim 17 wherein the scanner comprises:
    a laser for scanning the roadside along the path to detect roadside signs; and
    a camera for capturing images of the roadside scanned by the laser.

20. Apparatus as in claim 17 wherein the scanner comprises a radio receiver for receiving signals from radio emitting tags placed near the roadside signs.

21. Apparatus as in claim 17 further comprising sensors for detecting control signals applied to the vehicle by the driver.

22. Apparatus as in claim 17 further comprising a display for displaying information from the processor with regard to operation of the vehicle by the driver.

23. Apparatus as in claim 17 further comprising a transmitter for sending the information with regard to the operation of the vehicle to a remote location.

* * * * *